United States Patent [19]

Yoshida

[11] Patent Number: 5,043,880
[45] Date of Patent: Aug. 27, 1991

[54] DATA FLOW PROCESSOR WHICH COMBINES PACKETS HAVING SAME IDENTIFICATION AND DESTINATION AND SYNCHRONIZES LOOP VARIABLES FOR DETECTING PROCESSING LOOP TERMINATION

[75] Inventor: Shinichi Yoshida, Nara, Japan
[73] Assignee: Sharp Kabushiki Kaisha, Osaka, Japan
[21] Appl. No.: 299,626
[22] Filed: Jan. 23, 1989

[30] Foreign Application Priority Data

Jan. 23, 1988 [JP] Japan ................................. 63-13453

[51] Int. Cl.5 .................... G06F 9/38; G06F 7/20; G06F 7/14; G06F 15/04
[52] U.S. Cl. .................................. 364/200; 364/241.8; 364/281.3; 364/281.4; 364/281.8; 364/263; 364/261; 364/259; 364/259.2; 364/271; 364/271.4; 364/260.4; 364/260.9; 364/232.22; 364/931.11; 364/931; 364/931.01; 364/938; 364/938.4; 364/946.2; 364/946.8; 364/950.3; 364/950; 364/942.8
[58] Field of Search ... 364/200 MS File, 900 MS File

[56] References Cited

U.S. PATENT DOCUMENTS

| | | | |
|---|---|---|---|
| 4,145,733 | 3/1979 | Misunas | 364/200 |
| 4,153,932 | 5/1979 | Dennis | 364/200 |
| 4,156,903 | 5/1979 | Barton | 364/200 |
| 4,156,908 | 5/1979 | Missios | 364/200 |
| 4,197,589 | 4/1980 | Cornish | 364/900 |
| 4,218,756 | 8/1980 | Fraser | 364/900 |
| 4,270,181 | 5/1981 | Tanakura | 364/200 |
| 4,288,860 | 9/1981 | Trost | 364/900 |
| 4,348,721 | 9/1982 | Brereton | 364/200 |
| 4,555,774 | 11/1985 | Bernstein | 364/900 |
| 4,556,938 | 12/1985 | Parker | 364/200 |
| 4,575,794 | 3/1986 | Veneski | 364/200 |
| 4,591,979 | 5/1986 | Iwashita | 364/200 |
| 4,675,806 | 6/1987 | Uchida | 364/200 |
| 4,719,503 | 1/1988 | Craver | 340/703 |
| 4,782,941 | 11/1988 | Inagami | 364/200 |
| 4,809,159 | 2/1989 | Sowa | 364/200 |
| 4,814,978 | 3/1989 | Dennis | 364/200 |
| 4,841,436 | 6/1989 | Asano | 364/200 |
| 4,965,715 | 10/1990 | Yoshida | 364/200 |

OTHER PUBLICATIONS

Article entitled "The U-Interpreter" to Arvind et al., Computer, Feb. 1982, pp. 42-49.

Primary Examiner—Archie E. Williams, Jr.
Assistant Examiner—Eric Coleman

[57] ABSTRACT

A data flow type information processor includes a program storing portion, a data pair producing portion and a processing portion. In the data flow type information processor in executing a data flow program having a loop structure, a function for synchronizing with all of loop variables, that is, function for assuring that the value of all of the loop variables are determined in a loop execution stage to be considered, is applied to a group of instruction information for determining a loop termination.

9 Claims, 7 Drawing Sheets

FIG. 2  PRIOR ART (a) OPERATOR  (b) DECISION ELEMENT  (c) T GATE  (d) F GATE (e) MERGE  (f) BOOLEAN OPERATOR  (g) DATA LINK  (h) CONTROL LINK

DATA FLOW PROCESSOR WHICH COMBINES PACKETS HAVING SAME IDENTIFICATION AND DESTINATION AND SYNCHRONIZES LOOP VARIABLES FOR DETECTING PROCESSING LOOP TERMINATION

BACKGROUND OF THE INVENTION

1. Field of the Invention

The present invention relates generally to data flow a processor for information processor. In particular, the invention is directed to a data flow type information processor for processing data in accordance with a data flow program.

2. Description of the Prior Art

Figure 1:
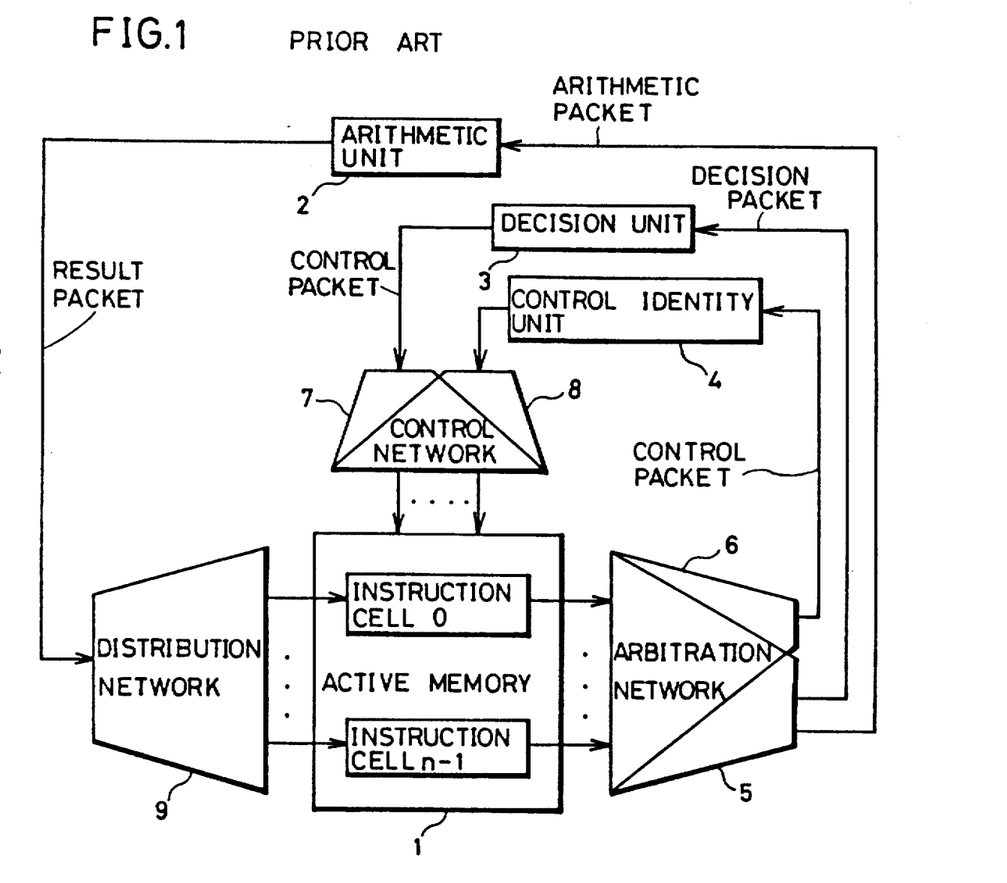
FIG. 1 is a block diagram showing an example of a conventional data flow type information processor.

FIG. 1 illustrated a block diagram of a basic processor (Japanese Patent Laying Open No. 344439/1978) by Jack B. Dennis, which is an example of a conventional data flow type information processor. In FIG. 1, an active memory 1 stores at least one active instruction record. An arithmetic unit 2 handles a signal associated with data calculation. A decision unit 3 handles a signal associated with selection. A control identity unit 4 handles a signal associated with program control. A first arbitration network 5 transfers a signal representing information packet from the active memory 1 to the arithmetic unit 2 and the decision unit 3. A second arbitration network 6 transfers a signal representing an information packet from the active memory 1 to the control identity unit 4. The first control network 7 transfers the information packet from the decision unit 3 to the active memory 1. The second control network 8 transfers the information packet from the control identity unit 4 to the active memory 1. A distribution network 9 transfers a signal data packet from the arithmetic unit 2 to the active memory 1.

Figure 2:
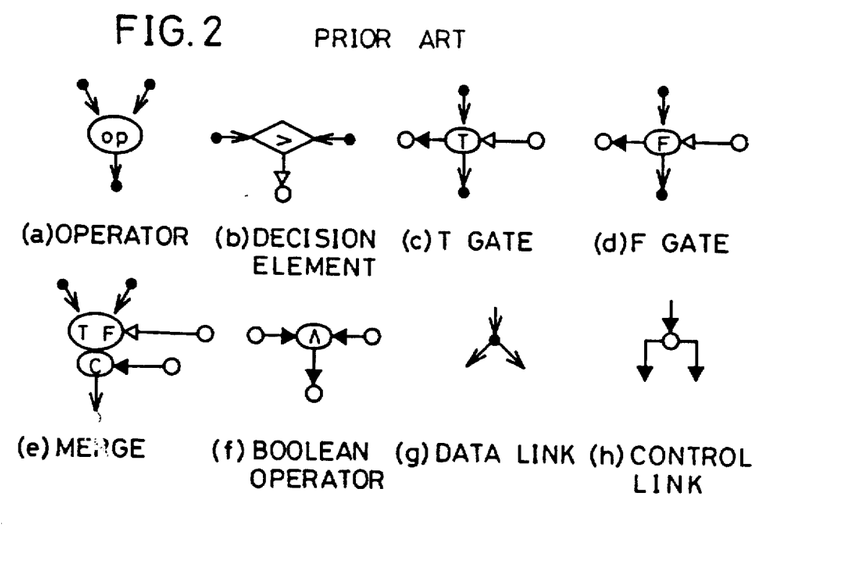
FIG. 2 is a diagram showing constituent elements of basic data flow language in the conventional example.

Meanwhile, basic data flow language comprises actor, link, and arc. A token flowing over the arc of the data flow program described in the basic data flow language comprises a data token, a Boolean control token and a control token. The data token represents numerical data. The Boolean control token takes the value of "truth" or "false". The control token has a control value for controlling the flow of the data token. The actor of the basic data flow language is shown in FIGS. 2(a), 2(c), 2(d), 2(e) and 2(f). An operator receives data token as an input, applies a predetermined operation to the input data token and then provides the operation result as a data token. A decision element receives data token as an input, applies to the input data token an operation for deciding a predetermined condition, and then provides the decision result as a Boolean control token of "truth" or "false". T gate receives data token and Boolean control token as inputs and provides the inputted data token intact if the inputted Boolean control token is "truth" and simultaneously produces control token and provides the same. On the other hand, the T gate produces only control token when the inputted Boolean control token is "false" and then outputs the produced token and absorbs the inputted data token. F gate receives data token and Boolean control token as inputs, just like the T gate, and provides the inputted data token intact if the inputted control token is "false" and at the same time, produces control token and provides the same as outputs. On the other hand, the F gate produces only control token when the inputted Boolean control token is "truth", and provides the produced token as an output and absorbs the inputted data token. Merge receives two data tokens, that is, Boolean control token and control token as inputs and provides as output the input data token on the T side intact when the inputted Boolean control token is "truth" and the inputted data token on the F side intact when "false". The Boolean operator receives, as input, Boolean control token or control token and, after a predetermined Boolean operation, provides, as an output, "truth" or "false" Boolean control token or control token. Link of the basic flow language is shown in FIGS. 2(g) and 2(h). Data link serves to send out a single inputted data token intact to one or more output arc by copying. A control link serves to send out a single inputted Boolean control token or control token to one or more output arcs by copying.

Figure 3:
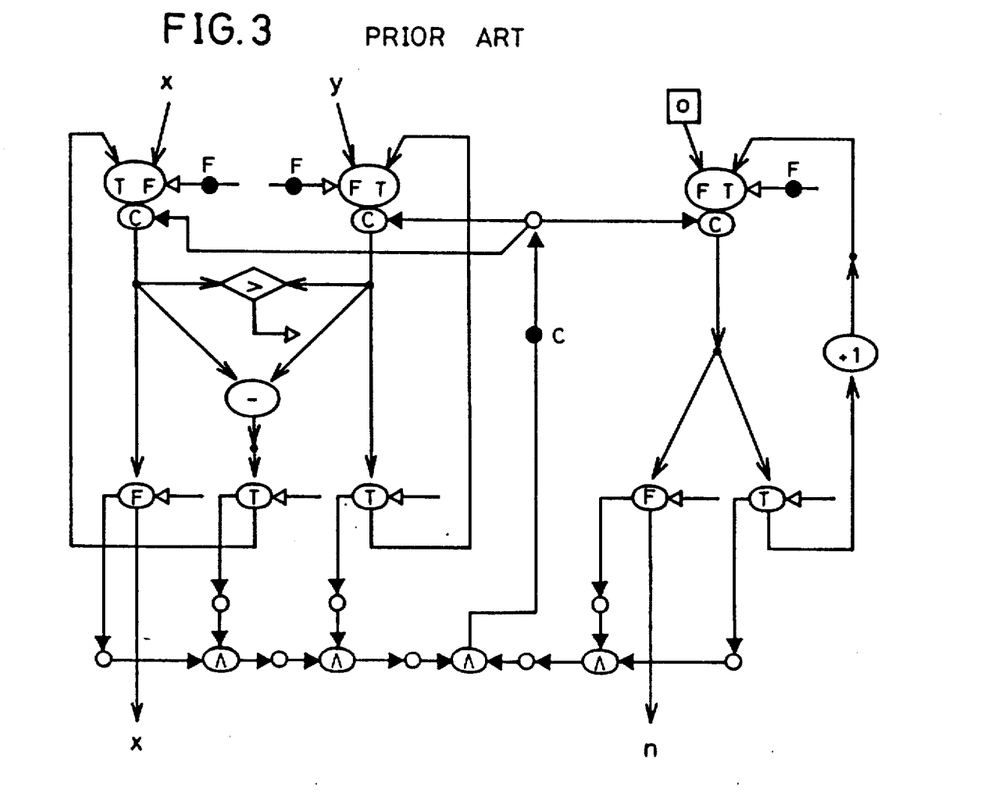
FIG. 3 is a diagram showing an example of the data flow program by the basic data flow language in the conventional example.
Figure 4:
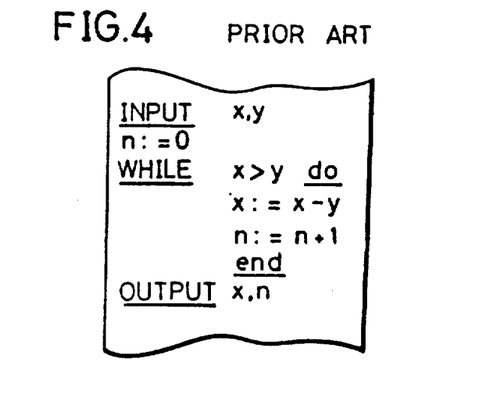
FIG. 4 is a diagram showing an example of a program containing a while type loop structure.

FIG. 3 shows a descriptive example of the data flow program by the basic data flow language. In FIG. 3, a program containing a while type loop structure shown in FIG. 4, that is, a loop structure of a type in which termination of the loop is determined before the execution of processing of a loop body, is described by the basic data flow language. In FIG. 3, a large solid circle F represents Boolean control token (false) in an initial state and a large solid circle C represents control token in an initial state. An execution of data flow program shown in FIG. 3 is started when data token corresponding to x or y arrives at the merge. After arrival of data token corresponding to x and y at the merge, comparison of x and y and operation of (x − y) are executed. The comparison result of x and y is sent to the T gate, the F gate and the merge, as a "truth" or "false" Boolean control token. If the comparison result is "truth", the control token is sent out to all of the merges for repetition of loop processing. This occurs after control tokens outputted from all of the T gates and F gates gather, that is, after processing of all of the T gates and F gates is completed. If the comparison result is "false", the data tokens corresponding to x and n are outputted from the F gates, which become the output data of the loop structure. Further, after the control tokens outputted from all of the T gates and F gates gather, that is, after processing of all of the T gates and F gates are completed, the control tokens are sent out to all of the merges and arrival of the data token corresponding to the next x or next y at the merges is awaited. Then, as soon as the data token arrives at the merges, the same processing as that at the time of arrival of data token corresponding to said x and y is repeated.

If and when the data flow program containing a loop structure is executed in the above described conventional example, processing of a loop body is repeated with respect to the present input data set to the loop structure or the loop processing is initiated with respect to the next input data set to the loop structure after completion of processing of all of the T gates and F gates forming the loop structure is detected (referred to as "a synchronization is obtained" hereinafter). More particularly, it is assured that execution of all of the actors included in the loop structure is completed before the next repetition with respect to the present input data set or a loop processing with respect to the next input data set is started. This is because, if the above described assurance is not obtained, the processing status in each path forming a loop in the loop structure is different, so that a token in a different cycle is likely to erroneously form a token pair.

In an execution control system based on an unwound manner of the loop structure shown in FIG. 3, in order to detect completion of a cycle in the loop structure an, OR operation is repeated with respect to all of the control tokens outputted from the T gates and F gates forming the loop structure. The number of OR operations required for detecting completion of one cycle in the loop structure is $(n+m-1)$, wherein n and m $(1 \leq m \leq n)$ denote the number of input and outputs to the loop structure. In addition, OR operators of more than $\log (n+m-1)$ which are arranged in series are required for achieving all of OR operations. In this case, the base of logarithm is 2, and thus, a minimum number of stages is required if the OR operators are arranged in a dichotomizing tree structure. The OR operators required for detecting completion of one cycle are required in execution of a data flow program having the above described loop structure. This decreases efficiency of program execution, resulting in an increase of execution time of program.

In addition, the above described execution control system employs a control mechanism in which by disposing the merges shown in FIG. 2 (e) in the input portion of the loop structure, the loop processing with respect to the next input data set to the loop structure is started after the loop processing with respect to the present input data set to the loop structure is completed. More particularly, the next input data set is caused to wait at the input portion of the loop structure until the loop processing with respect to the present input data set is completed. As a result, the parallelism inherent to the program is restricted. Thus, efficiency of program execution is decreased.

In addition, since three kinds of tokens, that is, data token, Boolean control token and control token are used as a token, and a processing units and networks are prepared for each token, the execution control system becomes complicated and the amount of hardware is increased.

SUMMARY OF THE INVENTION

An object of the present invention is to provide an execution control system of a data flow program which can eliminate the above described problems and which has a high efficiency of a program execution and uses simple hardware.

According to the data flow type information processor of the present invention, identifier (color) information for identifying different data sets is applied to a data packet, and means for determining the condition of a loop termination is adapted to determine completion of one cycle in the loop structure.

According to the present invention, the number of operators and the number of instruction executions required for assuring completion of one cycle in the loop structure can be reduced, and loop processing between different data sets can be executed in parallel. As a result, efficiency of program execution can be increased. In addition, only one kind of token can be used, so that data and control processing can be handled in a unified manner, resulting in simplification of hardware.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 5:
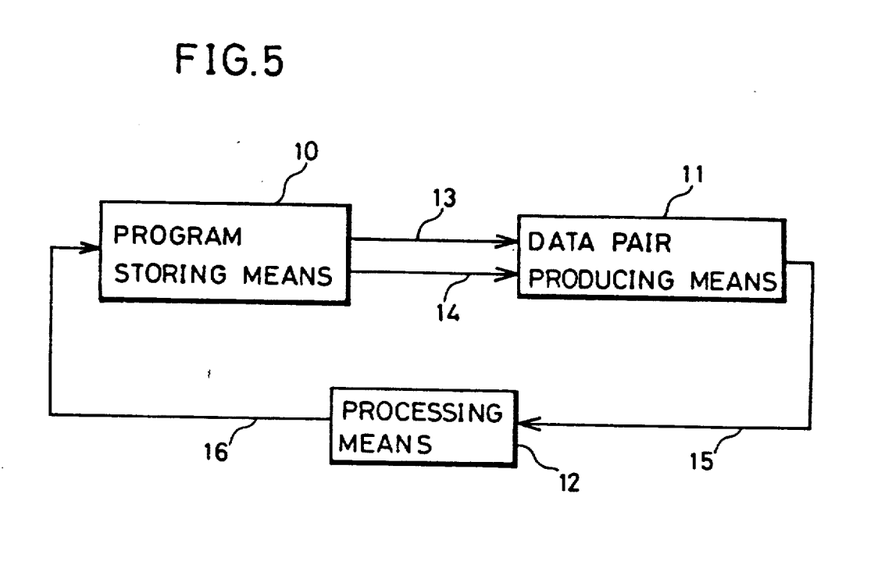
FIG. 5 is a block diagram showing a structure of a data flow type information processor of an embodiment of the present invention.
Figure 6:
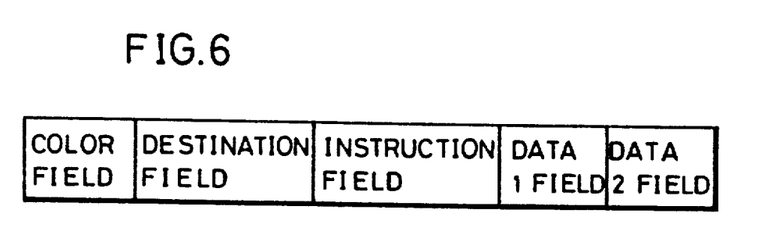
FIG. 6 is a diagram showing an example of a field structure of a data packet processed by the embodiment of the present invention.
Figure 7:
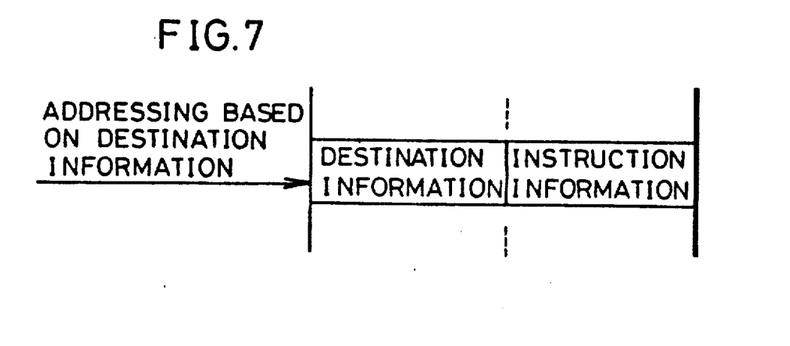
FIG. 7 is a diagram showing a field structure of the storage content of the program storing means in the embodiment of the present invention.

FIG. 5 shows a block diagram of a data flow type information processor of an embodiment of the present invention. FIG. 6 shows a field structure of a data packet processed in the embodiment. FIG. 7 shows a field structure of storage content in the program storing means.

The data packet shown in FIG. 6 comprises a color field, a destination field, an instruction field, and data 1 field and data 2 field. The color field stores color information for identifying different data set. The destination field stores destination information. The instruction field stores instruction information. The data 1 field or data 2 field stores operand data.

The information processor shown in FIG. 5 comprises a program storing means 10, data pair producing means 11 and processing means 12. The program storing means 10 comprises a program memory (not shown) in which the data flow program shown in FIG. 7 is stored. The program storing means 10 is responsive to addressing based on the destination information of the input data packet in FIG. 6 to read out the next destination information and next instruction information from the program memory and then to store the read information in the destination field and the instruction field of the input data packet and output that packet. The data pair producing means 11 queues the data packet outputted from the program storing means 10, that is, detects two different data packets having the same color information and the same destination information and then stores the operand data stored in one of the above described two different data packets having the same color information and destination information, that is the content stored in the data 1 field, for example, shown in FIG. 6 in the data 2 field shown in FIG. 6 of the other data packet, and then outputs that data packet. At that time, the above described one data packet disappears. The processing means 12 decodes the instruction data in the instruction field of the data packet outputted from the data pair producing means 11 and applies operation processing to the operand data stored in the data 1 field and data 2 field in that data packet. Then, the operation result is stored in the data 1 field of the input data packet and that data packet is outputted to the program storing means. The storing means 10 and the data pair producing means 11 are coupled by data transmission paths 13 and 14. The data pair producing means 11 and the processing means 12 are coupled to data transmission path 15. The processing means 12 and the program storing means 10 are coupled to a data transmission path 16.

The data packet circulates through the program storing means 10, the data pair producing means 11, and the processing means 10 in that order, so that the processing based on the data flow program stores in the program storing means 10 progresses.

Figure 8:
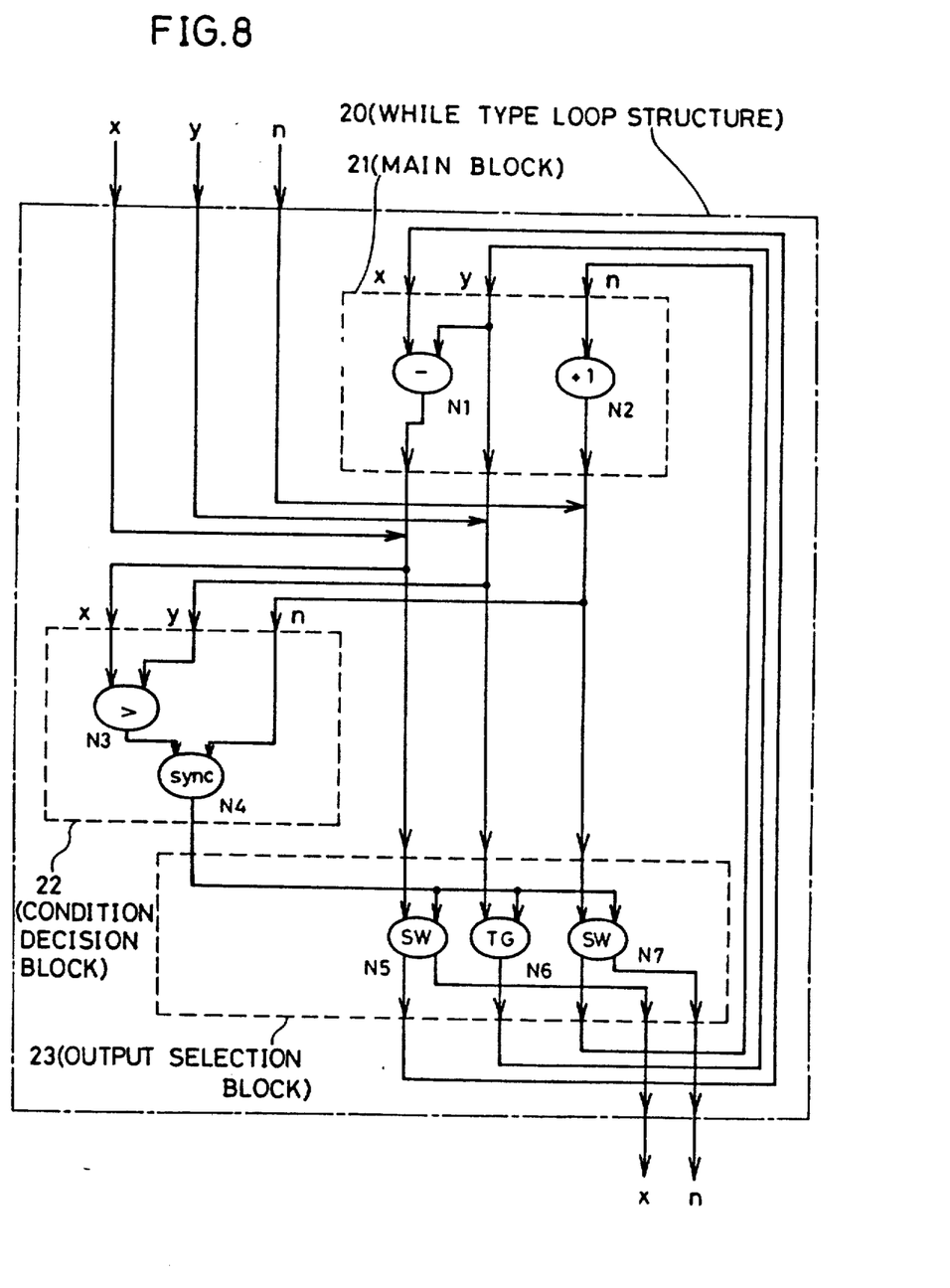
FIG. 8 is a diagram showing an example of an unwound manner of a loop structure having a data flow program in one embodiment of the present invention.

FIG. 8 shows an example of an unwound manner of a loop structure having data flow program in one embodiment of the present invention. In FIG. 8, the data flow program having a while type loop structure shown in FIG. 4, which is the same program as the conventional example, is unwound two-dimensionally. Only one type of token flows over the data flow program shown in FIG. 8 and is implemented as a data packet shown in FIG. 6 in the data flow type information processor shown in FIG. 5. In FIG. 8, N1-N7 denote nodes representing contents of operations to be processed in the processing means 12. The node N3 makes a predetermined comparison and decision with respect to the inputted token pair and provides, as an output, "truth" or "false". Identification of "truth"/"false" is achieved by setting the content in the data 1 field node of the output data packet, for example, to "1" in case of "truth" and "0" in case of "false". The node N4 is a node for synchronization of tokens flowing over the data flow program, and provides a left input token after input tokens gather. SW nodes N5 and N7 serve to provide a left input token as a left output and provide nothing at the right output when the right input token is "truth", and to provide the left input token as a right output and provide nothing at the left output when the right input token is "false". PG node N6 provides the left input token intact as an output if the right input token is "truth" and provides nothing when the right input token is "false", that is, absorb the input token pair. In FIG. 8, the while type loop structure comprises a main or body block 21, condition decision block 22 and output selection block 23. The body block 21 is a processing body in the loop structure. The condition decision block 22 determines determination of a loop from the inputted token set and provides "truth" (signifying continuation of loop processing) or "false (signifying termination of loop processing) output. The output selection block 23 selects destination of the other input token set inputted from the main block 21 in accordance with the content in the token representing "truth"/"false" inputted from the condition decision block 22. Each of the blocks 21 to 23 serves to classify all of the nodes in the loop structure from viewpoint of function so that mutual connection structure can be made clear. Thus, theses blocks provides no effect for execution of the data flow program.

In the unwound manner of the loop structure shown in FIG. 8, the condition decision block 22 serves to detect completion of one cycle in the loop structure, as well as to determine termination of the loop from the input token set, that is, all of the loop variables. More particularly, according to the connecting structure shown in FIG. 8, since all of the loop variables are synchronized in the condition decision block 22, processing of the condition decision block 22 is not completed unless processing of the main block 21 is completed. In addition, processing with respect to all of the nodes in the output selection block 23 is not started unless processing of the condition decision block 22 is terminated. This is so that the processing of the main block 21 is not started with respect to the next cycle.

As seen from the foregoing, according to the unwound manner of the loop structure shown in FIG. 8, the nodes in the condition decision block 22 have the same function as that of the group of OR operators in the unwound manner of the convention loop structure (FIG. 3). The number of the OR operators in FIG. 3 is $(n+m-1)$, wherein n and m $(1 \leq m \leq n)$ denote the number of input and output to the loop structure, and n is also the number of loop variables. In addition, in order to achieve all of the OR operations, more than log $(n+m-1)$ stages of OR operators are required to be arranged in series. On the other hand, according to the present embodiment, sync node N4 in the condition decision block 22 corresponds to OR operators in the conventional example and the node N3 essentially required for determining condition of loop termination has the function corresponding to the OR operator. Furthermore, as shown in FIG. 8, the number of tokens necessary for synchronization can be limited to the number, n, of loop variables by making synchronization for detecting completion of one cycle in the loop structure before output selection by the gates. Accordingly, in the present embodiment, the number of sync nodes necessary for detecting completion of one cycle in the loop structure is at most $(n-1)$. Therefore, if condition for loop termination is complicated and hence it is necessary to determine the termination by referring to many loop variables, the number of sync nodes as required is decreased. For example, in case where loop termination is determined by referring to all of the loop variables, the number of sync nodes necessary for detecting completion of one cycle is 0. In addition, since the node essentially required for determining condition for loop termination has the function of detecting termination of one cycle in the loop structure, the number of nodes connected in series in one cycle of the loop can be reduced to less than the number in the conventional example.

Meanwhile, since nodes in the loop structure can be repeatedly executed, the larger the number of loop repetitions is, the better the effect of reduction of the number of nodes described in the foregoing is. This can increase efficiency of program execution.

In addition, in the present embodiment, the token pair can be prevented from being produced between different token sets to the loop structure, by adding, in the data flow type information processor shown in FIG. 5, a color field storing color information in the data packet shown in FIG. 6. Accordingly, even if a token of different token set exists in the same loop structure, no confusion occurs. From the foregoing, in the unwound manner of loop structure shown in FIG. 8, the function of merge which was required in the conventional example is not required. Thus the number of execution nodes can be reduced. Further, efficiency of program execution can be increased by making possible parallel processing possible with respect to different token sets in the same loop structure.

Now a general unwound manner of various loop structures having a data flow program in the present embodiment will be described.

Figure 9:
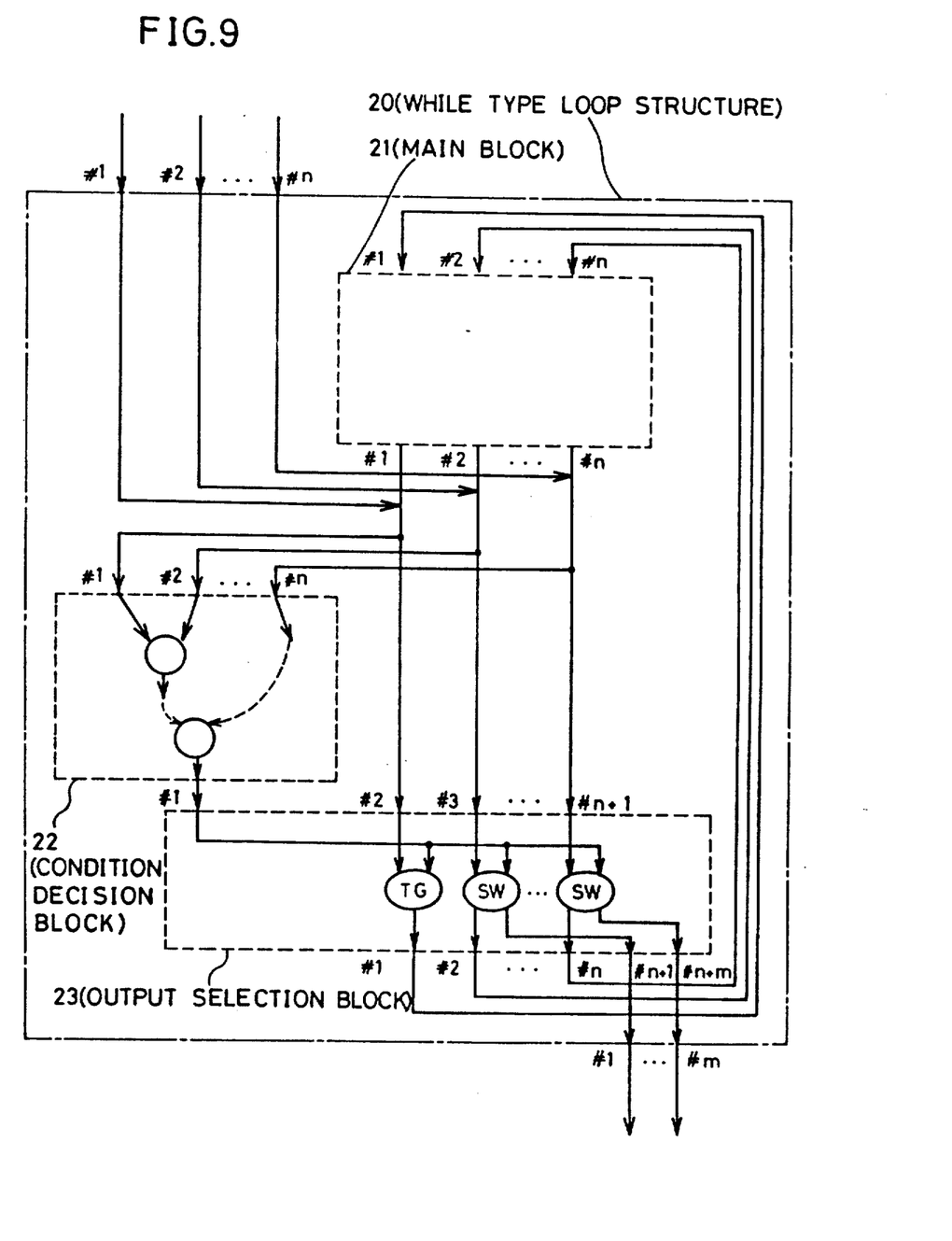
FIG. 9 is a diagram showing a general unwound manner of a while type loop structure having a data flow program in one embodiment of the present invention.

FIG. 9 shows a general unwound manner of a while type loop structure shown in FIG. 8. The while type loop structure 20 comprises n inputs and m outputs. The main block 21 is a processing body in the loop structure. The main block 21 has m inputs and n outputs, in which the data flow program corresponding to the processing body of the loop is unwound in the block. The condition decision block 22 determines termination of loop in response to the input token set and provides "truth" (signifying continuation of loop processing) or "false" (signifying termination of loop processing) output. The condition decision block 22 has n inputs and a single output. It provides "truth" "false" output by synchronizing with all of the loop variables which are not required for determining a loop termination through dichotomizing tree structure arrangement of sync nodes, and further by synchronizing with the result of "truth" or "false" obtained by referring to all of the loop variables necessary for determining loop termination. In FIG. 9, dotted arrows in the condition decision block 22 represent data depending relation between nodes. The output selection block 23 selects destination of the other input token set inputted from the main block 21 in accordance with the content of the token representative of "truth"/"false" inputted from the condition decision block 22. The output selection block 23 has (n+1) inputs and (n+m) outputs. Further, as shown in FIG. 9, it uses, as an output selecting gate, SW node with respect to the loop variables which can be output variables of the loop structure, and TG node with respect to the loop variables which, cannot be output variables. The connecting relation among the blocks 21 to 23, and exterior of the loop structure can be seen in FIG. 9.

Figure 10:
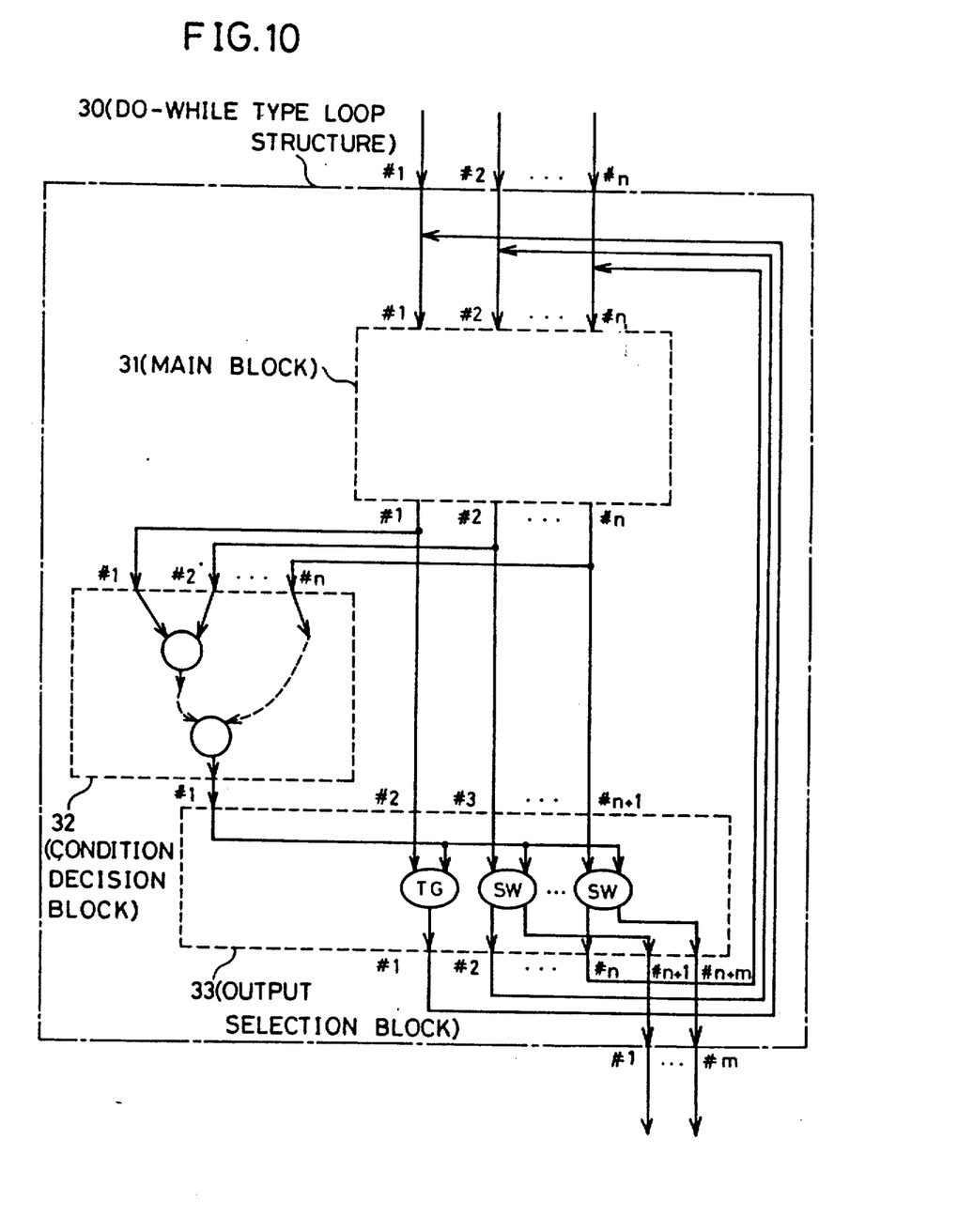
FIG. 10 is a diagram showing a general unwound manner of a do-while type structure having a data flow program in one embodiment of the present invention.

FIG. 10 shows a general unwound manner of a do-while type loop structure, that is, loop structure in which processing of loop body is first performed and then loop termination is determined. The do-while type loop structure 30 has n inputs and m outputs. In FIG. 10, a main block 31, a condition decision block 32 and an output selection block 33 are the same as the main block 21, the condition decision block 22 and the outputs selection block 23 in FIG. 9. Connecting relation among the blocks 31 to 33 and the exterior of the loop structure can be seen from FIG. 10.

Figure 11:
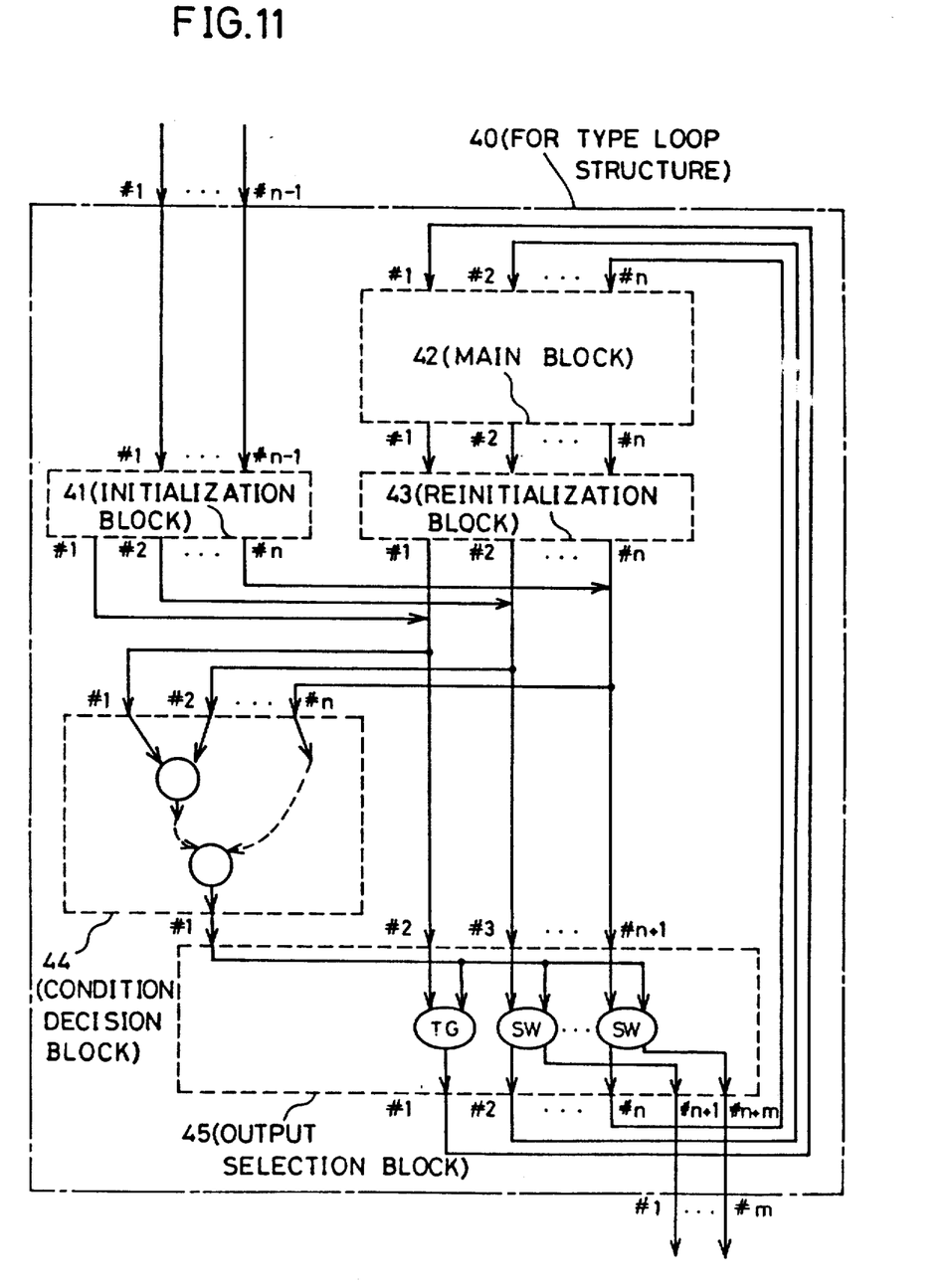
FIG. 11 is a diagram showing a general unwound manner of a FOR type loop structure having a data flow program in one embodiment of the present invention.

FIG. 11 shows a general unwound manner of a for type loop structure, that is, a loop structure in which after initial value for loop control variables is set, loop termination is determined, and then after processing of loop body, reinitialization of loop control variables is performed. The for type loop structure 40 has (n−1) inputs and m outputs. In FIG. 11, an initialization block 41 initialize loop control variables. The initialization block 41 has (n − 1) inputs and n outputs in which the data flow program is unwound for initialization of the loop control variables and the loop control variables are outputted from the output terminal #1 at the most left side. From the output terminals #2 to #n, tokens inputted from the input terminals #1 to # (n−1) are outputted intact. The reinitialization block 43 reinitializes loop control variables. The reinitialization block 43 has n inputs and n outputs, wherein the data flow program is unwound for reinitialization of the loop control variables and the reinitialized loop control variables are outputted from the output terminal #1 at the left most side. From the output terminals #2 to #n, tokens inputted from the input terminals #2 to #n are outputted intact. The main block 42, the condition decision block 44 and the output selection block 45 are the same as the main block 21, the condition decision block 22 and the output selection block 23 in FIG. 9, respectively. The connection relation among the blocks 41 to 45 and the exterior of the loop structure can be seen in FIG. 11.

As described in the foregoing, the number of execution instructions can be decreased by applying the function of synchronizing with all of the loop variables, that is, the function for assuring that the value of all of the loop variables has been determined in a loop execution stage to be considered, to a group of instruction information for determined loop termination, in executing a data flow program having a loop structure, and execution with respect to a token set having different color can be made possible. As a result, efficiency of execution of a loop structure can be increased.

Although the present invention has been described and illustrated in detail, it is clearly understood that the same is by way of illustration and example only and is not to be taken by way of limitation. The spirit and scope of the present invention being is limited only by the terms of the appended claims.

What is claimed is:

1. A data flow type information processor for processing data in accordance with a data flow program containing a plurality of destination information and a plurality of instruction information corresponding to the plurality of destination information, the data including a data packet containing a color field storing color information for identifying a data set, a destination field storing destination information, an instruction field storing instruction information, and first and second data fields storing operand data, the data flow processor comprising:

program storing means for storing the data flow program;

said program storing means sequentially reading out destination information and instruction information from the data flow program corresponding to each of a plurality of input data packets, in response to addressing based on destination information stored in the destination field of an inputted data packet, and storing the read information in the destination field and instruction field of the data packet, respectively, and then, outputting the data packet;

data pair producing means for queuing a plurality of data packets outputted from said program storing means;

said data pair producing means detecting when two data packets have the same color information and destination information, from the plurality of outputted data packets, and storing the data of the first data field of one data packet in the second data field of the other data packet and then outputting the other data packet; and operation processing means for receiving the other data packet outputted from said data pair producing means and for processing the data of the first and second data fields of the other data packet;

said operation processing means decoding the instruction information of the instruction field of said other data packet and processes the data in said first and second data fields according to a predetermined operation based upon the instruction information, and storing a processing result in one data field of the data packet and outputting a resultant data packet to said program storing means;

said operation processing means including loop condition detecting means for detecting a condition for termination of a processing loop, including a plurality of loop execution stages during execution of a data flow program having a loop structure according to said predetermined operation, said determining means continuously determining a single value for said plurality of loop variables of a data packet being processed in each loop executing stage, and thus obtaining synchronization of said plurality of loop variables.

2. The data flow type information processor of claim 1, wherein the operation processing means further includes, loop updating means, coupled to said loop condition determining means, for sequentially updating a value for at least one of the plurality of loop variables based upon a predetermined inter-variable operation, for each sequential loop executing stage, and for outputting each of said plurality of loop variables.

3. The data flow type information processor of claim 2, wherein said operation processing means receiving said plurality of output loop variables and upon said predetermined operation, between at least two of said plurality of loop variables outputted from said loop updating means, not being satisfied, said loop condition detecting means detecting said condition for termination for said processing loop.

4. The data flow type information processor of claim 3, wherein said loop condition determining means further includes, synchronizing means for synchronizing and combining said plurality of loop variables, subsequent to said predetermined operation, into a single value and outputting said single value.

5. The data flow type information processor of claim 4, wherein the operation processing means further includes, output selection means, coupled to said loop condition detecting means and said loop updating means, for receiving each of said plurality of loop variables from said loop updating means and said single value from said loop condition detecting means, terminating said processing loop upon said single value indicating detection of said condition for termination, and for outputting a final value of at least one of said plurality of loop variables upon said processing loop terminating.

6. The data flow type information processor of claim 5, wherein said output selection means, upon said single value from said loop condition detecting means indicating said processing loop is not to be terminated, outputting each of said plurality of loop variables to said loop updating means for a subsequent loop executing stage.

7. A data flow type information processing apparatus for processing data in accordance with a data flow program containing a plurality of destination information and a plurality of instruction information corresponding to the plurality of destination information, the data including data packets containing identifier information for identifying a data set, a destination field storing destination information, an instruction field storing instruction information, and first and second data fields storing operand data, the apparatus comprising:

program storing means, storing the data flow program, for sequentially reading out destination information and instruction information from the data flow program corresponding to each of a plurality of input data packets and sequentially outputting each data packet;

data pair producing means, coupled to said program storing means, for comparing said output data packets and for detecting when two data packets have the same identifier information an destination information, from the plurality of outputted data packets, and storing the data of the first data field of one data packet in the second data field of the other data packet and then outputting the other data packet; and operation processing means, coupled to said data pair producing means, for receiving the output other data packet and processing data, including a plurality of loop variables, within the first and second data field to obtain values of at least one of said plurality of loop variables, through a processing loop including at least one of a plurality of loop execution stages, said operation processing means including, loop condition detecting means for determining processing loop termination, during processing loop execution, upon a plurality of said loop variables not satisfying a predetermined operation previously stored as instruction information within said data packet, and for synchronizing said plurality of loop variables into a single output signal indicative of said determination of processing loop termination, output selection means for receiving said single output signal and for outputting values of at least one of said plurality of loop variables upon said single output signal indicating processing loop termination and for internally, within said processing loop, outputting values for each of the plurality of loop variables indicating loop execution stage, upon said single output signal not indicating processing loop termination, and variable updating means for receiving values for each of said internally output plurality of loop variables from said output selection means for execution of a next loop execution stage, for updating values of at least one of said plurality of loop variables based upon at least a different one, of said plurality of loop variables, and for subsequently outputting each of said plurality of loop variables to said operation processing means for loop termination determination.

8. The apparatus of claim 7, wherein the identifier information for identifying a particular data set is color information stored in a color field of each of the data packets.

9. The apparatus of claim 8, wherein multiple data sets of information can be processed continuously for a plurality of data packets, each pair of data packets, being processed, containing like color information.

* * * * *